United States Patent [19]

Ohata et al.

[11] Patent Number: 4,765,838

[45] Date of Patent: Aug. 23, 1988

[54] WATER-SOLUBLE DYE COMPOSITION AND RECORDING LIQUID CONTAINING THE SAME

[75] Inventors: Tokuya Ohata; Masatsune Kobayashi; Yuko Suga; Konoe Miura; Hiroshi Takimoto, all of Yokohama; Tomio Yoneyama, Kawasaki, all of Japan

[73] Assignees: Mitsubishi Chemical Industries Ltd.; Canon Kabushiki Kaisha, both of Tokyo, Japan

[21] Appl. No.: 895,441

[22] Filed: Aug. 11, 1986

[30] Foreign Application Priority Data

Aug. 13, 1985 [JP] Japan ................................ 60-178225

[51] Int. Cl.$^4$ ............................................. C09D 11/02
[52] U.S. Cl. ......................................... 106/22; 106/20
[58] Field of Search .................. 106/20, 22; 523/160, 523/161; 260/DIG. 38

[56] References Cited

U.S. PATENT DOCUMENTS

| | | | |
|---|---|---|---|
| 4,239,544 | 12/1980 | Strem .................................... | 106/22 |
| 4,508,570 | 4/1985 | Fujii et al. ............................. | 106/20 |
| 4,601,756 | 7/1986 | Chiba et al. ........................... | 106/22 |
| 4,631,085 | 12/1986 | Kawanishi et al. ................... | 106/22 |

FOREIGN PATENT DOCUMENTS 2739784 3/1979 Fed. Rep. of Germany .
3438421 5/1985 Fed. Rep. of Germany .

OTHER PUBLICATIONS

Patent Abstracts of Japan, vol. 6, No. 158, 8-1982 (C-120)(1036).
Patent Abstracts of Japan, vol. 8, No. 205, 9-1984 (C-243)(1642).
Patent Abstracts of Japan, vol. 8, No. 15, 1-1984 (C-206)(1452).
Patent Abstracts of Japan, vol. 6, No. 208, 10-1982 (C-130)(1086).

*Primary Examiner*—Josephine Barr
*Attorney, Agent, or Firm*—Fitzpatrick, Cella, Harper & Scinto

[57] ABSTRACT

A black recording liquid suitable for use in ink-jet recording or as an ink for writing instruments comprises at least two water-soluble dyes and a liquid medium. Each of the dyes satisfies the condition defined by the following expression [I], and a mixture of these dyes satisfies the condition defined by the following expression [II].

$$0 \leq \sqrt{a^{*}_{i}{}^{2} + B^{*}_{i}{}^{2}} \leq 10 \quad [\text{I}]$$

$$0 \leq \sqrt{\left(\sum_{i=1}^{n} a^{*}_{i}\right)^{2} + \left(\sum_{i=1}^{n} b^{*}_{i}\right)^{2}} \leq 2 \quad [\text{II}]$$

In these expressions, a* and b* are chromaticness indices defined in the CIE 1976 (L*, a*, b*) space, i indicates the ith dye of the dyes used together, and n is an integer of 2 or more.

39 Claims, No Drawings

WATER-SOLUBLE DYE COMPOSITION AND RECORDING LIQUID CONTAINING THE SAME

FIELD OF THE INVENTION

This invention relates to a black water-soluble dye composition and a recording liquid containing the same for use in ink-jet recording or in writing instruments.

BACKGROUND OF THE INVENTION

Several colorimetric systems have been examined in order to quantitatively deal with colors that are perceived by the human sense. The present specification employs the (L*a*b*) colorimetric system which has recently been evaluated as most suitable. The symbols a* and b* mean chromaticness indices defined in the CIE 1976 (L*, a*, b*) space (see pages 137–143, "Handbook Science of Color, New Edition", edited by the Japanese Society of Science of Color).

A color which looks black to the human eye is generally in the region defined by $0 \leq \sqrt{a^{*2}+b^{*2}} \leq 2$. It is said that as this value approaches zero, the color becomes in ideal black color.

For the preparation of black color recording liquids for ink-jet recording, there have previously been known a method comprising mixing yellow, magenta and cyan as described, for example, in the published specifications of Japanese Patent Application (OPI) Nos. 5771/1982, 76071/1982, 164170/1982 and 101171/1982 (the term "OPI" as used herein refers to a "published unexamined Japanese patent application"), a method comprising mixing greenish black with red or violet as described, for example, in the specifications of Japanese Patent Application (OPI) Nos. 183764/1983, 183765/1983, 183766/1983, 183767/1983, and 201863/1983, and a method comprising mixing bluish black with greenish black as described, for example, in the specifications of Japanese Patent Application (OPI) Nos. 93766/1984, 93767/1984, and 93768/1984.

However, recording liquids prepared by mixing yellow, magenta and cyan, or by mixing greenish black with red or violet have the disadvantage that when they are used in recording on paper or when recorded images get wet with water or alcohol, color separation occurs in the surrounding parts of recorded dots owing to slight differences of the individual colors in their affinity for paper and their solubility in solvents, and the quality of printed characters is markedly degraded.

The method comprising mixing bluish black with greenish black has the disadvantage that a region having a $\sqrt{a^{*2}+b^{*2}}$ value of 0 to 2 is very difficult to obtain, and the color of the recording liquid varies greatly depending upon the type of paper.

SUMMARY OF THE INVENTION

Accordingly, one object of this invention is to provide a black water-soluble dye composition which has high solubility in a liquid medium component, high solution stability for a long period of time, ideal color value and excellent light fastness.

Another object of this invention is to provide a black recording liquid which has high solubililty in a liquid medium component, high solution stability for a long period of time, does not significantly clog ejection orifices, assumes a black color having an ideal color value, varies very little in color depending upon the type of paper, and has excellent light fastness.

The water-soluble dye composition according to this invention comprises a mixture of at least two water-soluble dyes, each of the dyes satisfying the condition defined by the following expression [I], and the mixture of at least two water-soluble dyes satisfying the condition defined by the following expression [II]

$$0 \leq \sqrt{a^{*i2} + b^{*i2}} \leq 10 \quad [I]$$

$$0 \leq \sqrt{\left(\sum_{i=1}^{n} a^{*i}\right)^2 + \left(\sum_{i=1}^{n} b^{*i}\right)^2} \leq 2 \quad [II]$$

wherein a and b are chromaticness indices defined in the CIE 1976 (L*, a*, b*) space, i indicates the ith dye of the dye used together, and n is an integer of 2 or more.

The recording liquid according to this invention comprises at least two water-soluble dyes and a liquid medium, each of the dyes satisfying the condition defined by the following expression [I], and a mixture of at least two dyes satisfying the condition defined by the following expression [II]

$$0 \leq \sqrt{a^{*i2} + b^{*i2}} \leq 10 \quad [I]$$

$$0 \leq \sqrt{\left(\sum_{i=1}^{n} a^{*i}\right)^2 + \left(\sum_{i=1}^{n} b^{*i}\right)^2} \leq 2 \quad [II]$$

wherein a* and b* are chromaticness indices defined in the CIE 1976 (L*, a*, b*) space, i indicates that ith dye of the dyes used together, and n is an integer of 2 or more.

DETAILED DESCRIPTION OF THE INVENTION

Specific combinations of dyes which satisfy the expression [I] in this invention are, for example, combinations of dyes in group X below with dyes in group Y below. Dyes selected from these groups should be such that their mixture satisfies the expression [II]. These dyes are properly mixed so that the resulting mixed dye has a color satisfying the expression $0 \leq \sqrt{a^{*2}+b^{*2}} \leq 2$.

Dyes of Group X

Dyes represented by the following formula (III)

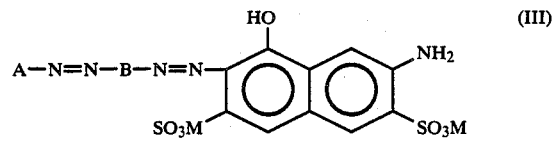

(III)

wherein A represents a phenyl group substituted by a lower alkylcarbonylamino group, a lower alkoxy group, the group $SO_3M$ or a phenylazo group which may optionally be substituted by the group $SO_3M$, or a naphthyl group substituted by the group $SO_3M$, B represents a naphthyl group substituted by the group $SO_3M$ or a phenyl group substituted by a lower alkoxy group and M represents an alkali metal, ammonium or an amine;

Dyes represented by the following formula (IV)

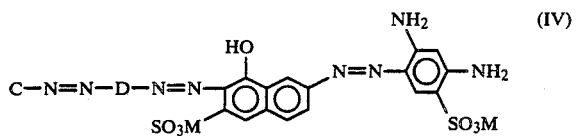

wherein C represents a phenyl or naphthyl group substituted by the group SO$_3$M, D represents a phenyl group substituted by a lower alkyl group, a lower alkoxy group or a lower alkylcarbonylamino group, and M is as defined above;

C. I. Direct Black-19, -22, -62, -108, -113, -154 and -159; and

C. I. Acid Black-7, -9, -29, -48, -52:1, -94:1, -109, -110, -187 and -208.

Dyes of Group Y

Dyes represented by the following formula (V)

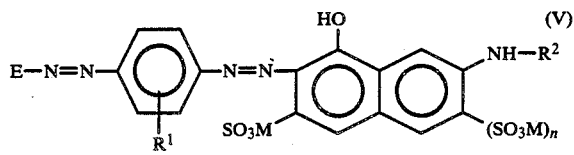

wherein E represents a naphthyl group substituted by the group SO$_3$M or a phenyl group substituted by a lower alkyl group, a lower akloxy group, a lower alkylcarbonylamino group, or a phenylazo group which may optionally be substituted by the group SO$_3$M, $R^1$ represents a lower alkyl group, a lower alkoxy group or a lower alkylcarbonylamino group, $R^2$ represents a hydrogen atom or a phenyl group substituted by the group SO$_3$M, n represents 0 or 1 and M is as defined above;

C. I. Acid Black-27, -137 and -158;
C. I. Direct Black-64, -93 and -94; and
C. I. Direct Brown-59 and -127.

Combinations of dyes represented by the formula [III] or [IV] with dyes represented by the formula [V] are preferred.

In the present invention, the lower alkyl group and the lower alkoxy group denote alkyl groups and alkoxy groups having 1 to 4 carbon atoms such as methyl, ethyl, propyl, methoxy, ethoxy and propoxy. Examples of the alkali metal represented by M are Na, K and Li, and examples of the amine are lower alkanolamines such as ethanolamine.

The amount of the mixed dye in the recording liquid is determined depending upon the type of the liquid medium component, the properties required of the recording liquid, etc. Generally, it is 0.5 to 15% by weight, preferably 1 to 8% by weight, based on the total amount of the recording liquid.

Water or mixtures of water with various water-soluble organic solvents may be used as the liquid medium component of the recording liquid of this invention. Examples of the water-soluble organic solvents include alkylalcohols having 1 to 4 carbon atoms such as methylalcohol, ethylalcohol, n-propylalcohol, isopropylalcohol, n-butylalcohol, sec-butylalcohol, tert-butylalcohol and isobutylalcohol; amides such as dimethylformamide and dimethylacetamide; ketones or ketonealcohols such as acetone and diacetonealcohol; ethers such as tetrahydrofuran and dioxane; nitrogen-containing heterocyclic ketones such as N-methyl-2-pyrrolidone and 1,3dimethyl-2-imidazolidinone; polyalkylene glycols such as polyethylene glycol and polypropylene glycol; alkylene glycols containing 2 to 6 carbon atoms in the alkylene group such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols such as ethylene glycol methyl ether, diethylene glycol methyl ether, diethylene glycol ethyl ether, triethylene glycol monomethyl ether and triethylene glycol monoethyl ether.

The content of the water-soluble organic solvent in the recording liquid is generally 5 to 95%, preferably 10 to 80%, more preferably 20 to 50%, by weight based on the total weight of the recording liquid.

The content of water at this time, is determined over a wide range depending upon the type of the solvent component, its composition, or the desired properties of the recording liquid. It is generally 10 to 90%, preferably 10 to 70%, more preferably 20 to 70%, based on the total weight of the recording liquid.

The recording liquid of this invention prepared from the aforesaid components has excellent recording characteristics (signal response, stability of liquid droplet formation, ejection stability, continuous recordability for a long period of time, ejection stability after stopping long-term recording), storage stability, fixability to a recording substrate, and the light resistance, weatherability and water resistance of recorded images in a well-balanced combination. In order to improve these properties further, various additives known heretofore may be further incorporated.

Examples of the additives include viscosity adjusting agents such as polyvinyl alcohol, celluloses and water-soluble resins; surface-active agents of the cationic, anionic or nonionic type; surface tension adjusting agents such as diethanolamine or triethanolamine; pH adjusting agents such as buffers; and antifungal agents.

A specific resistance adjusting agent, for example inorganic salt such as lithium chloride, ammonium chloride or sodium chloride is added in order to prepare a recording liquid which is used in an ink-jet recording method of the type involving charging the recording liquid.

Thermal properties (such as specific heat, the coefficient of thermal expansion, thermal conductivity, etc.) of the recording liquid may sometimes be adjusted when it is applied to an ink-jet recording method of the type in which the recording liquid is ejected by the action of thermal energy.

Recording by using the recording liquid of this invention may be carried out by known methods of recording, for example the method described in U.S. Pat. No. 4,295,889.

The use of the recording liquid of this invention makes it possible to obtain black recorded images having an ideal color value.

The viscosity and surface tension of the recording liquid of this invention are within proper ranges. Hence, it does not clog fine orifices, and recorded images having a sufficiently high density can be obtained.

Furthermore, the recording liquid of this invention do not change in physical properties, nor cause precipitation of solids, during storage.

In addition, the recording liquid of this invention can permit recording on various recording substrate without any particular restriction. It has a high speed of fixation and can give images having excellent water resistance, light resistance, abrasion resistance, resolution and printed character quality.

In addition to its application to ink-jet recording, the recording liquid of this invention can also be used as ink for writing instruments.

The present invention is explained in more detail by reference to the following examples.

EXAMPLE 1

A black recording liquid for ink-jet recording having the following composition was prepared.

| Composition of the recording liquid | Amount (wt %) |
|---|---|
| C.I. Direct Black-154 ($a^*$ −3.0, $b^*$ −3.6) | 1.5 |
| C.I. Direct Brown-59 ($a^*$ 2.1, $b^*$ 5.3) | 1.5 |
| Diethylene glycol | 20 |
| N—methyl-2-pyrrolidone | 15 |
| Deionized water (simply water hereinafter) | 62 |

The $a^*$ and $b^*$ values of a single dye were determined on Xerox Paper 4024 (made by Zerox Corporation). This applies also to the subsequent Examples.

The above ingredients were fully mixed in a vessel and filtered under pressure through a filter made of Teflon (Trademark) having a pore size of 1 micron. The liquid was subjected to deaerating treatment using a vacuum pump to form a recording liquid.

The resulting recording liquid was evaluated in regard to the following properties ($T_1$) to ($T_5$) by means of a recording device having an on-demand type recording head (ejection orifice diameter 50 microns; piezo vibrator driving voltage 60 V, frequency 4 KHz) adapted to eject the recording liquid by a piezo vibrator. Good results were obtained in each of these test items.

($T_1$) Storability of the recording liquid over a long period of time

The recording liquid was sealed up in a glass container, and stored for 6 months both at −30° C. and at 60° C. After this storage, precipitation of insoluble matter was not observed, and there was no change in the properties or color of the liquid.

($T_2$) Ejection stability

The recording liquid was continuously ejected for 24 hours in an atomsphere kept at room temperature, 5° C., and 40° C., respectively. Under any of these conditions, high quality stable recording could be always carried out.

($T_3$) Ejection response

The recording liquid was ejected intermittently at intervals of 2 seconds. Furthermore, after standing for 2 months, the recording liquid was ejected. In either case, the recording liquid did not clog the tip portion of the orifice, and stable and uniform recording could be achieved.

($T_4$) Quality of recorded images

Images recorded on the two recording substrates shown in Table 1 below had a high density and were clear. The colors ($a^*$ and $b^*$ values) of the images are shown in Table 1. After exposure of the image to indoor light for 3 months, the percent decrease of their density was less than 1%. When the images were dipped for 1 minute in water, the bleeding of the images was only slight.

($T_5$) Fixability to various recording substrates

By using the recording liquid, characters were printed on each of the recording substrates indicated in the following table for 15 seconds, and then the printed portion was rubbed with a finger and examined fpr image deviation and blotting. In all cases, there was no image deviation nor blotting, and the recording liquid showed excellent fixability to the substrates.

EXAMPLE 2

| Composition of the recording liquid | Amount (wt %) |
|---|---|
| C.I. Direct Black-19 ($a^*$0.1, $b^*$ −4.1) | 1.0 |
| C.I. Acid Black-109 ($a^*$ −1.5, $b^*$ −1.9) | 1.0 |
| C.I. Direct Black-64 ($a^*$2.1, $b^*$2.3) | 1.0 |
| Ethylene glycol | 20 |
| N—methyl-2-pyrrolidone | 10 |
| Water | 67 |

A recording liquid of the above composition was prepared in the same way as in Example 1, and then examined for ($T_1$) to ($T_5$) using a recording device having an on-demand type multihead (ejection orifice diameter 35 microns, the resistance of a heat-generating resistance body 150 ohms, driving voltage 30 V, frequency 2 KHz) adapted to perform recording by giving thermal energy to the recording liquid within the recording head and generating liquid droplets of the recording liquid. In all tests, the recording liquid produced excellent results. The color of the resulting recorded images are shown in Table 1.

EXAMPLE 3

| Composition of the recording liquid | Amount (wt %) |
|---|---|
| Dye No. 4 in table 2 ($a^*$−4.4, $b^*$−2.1) | 2.5 |
| Dye No. 1 in Table 4 ($a^*$4.4, $b^*$−0.9) | 2.5 |
| Ethylene glycol | 15 |
| 1,3-Dimethyl-2-imidazolidinone | 30 |
| Water | 50 |

A recording liquid of the above composition was prepared in the same way as in Example 1, and then examined for ($T_1$) to ($T_5$) using a recording device having an on-demand type multihead (ejection orifice diameter 35 microns, the resistance of a heat-generating resistance body 150 ohms, driving voltage 30 V, frequency 2 KHz) adapted to perform recording by giving thermal energy to the recording liquid within the recording head and generating liquid droplets of the recording liquid. In all tests, the recording liquid produced excellent results.

The colors of the resulting recorded images are shown in Table 1.

EXAMPLE 4

| Composition of the recording liquid | Amount (wt %) |
|---|---|
| Dye No. 1 in Table 2 ($a^*$−5.4, $b^*$−1.5) | 2.0 |
| Dye No. 2 in Table 4 ($a^*$5.3, $b^*$0.6) | 2.0 |
| Diethylene glycol | 25 |
| Ethylene glycol monomethyl ether | 10 |
| Water | 61 |

A recording liquid of the above composition was prepared in the same way as in Example 1, and then examined for ($T_1$) to ($T_5$) using a recording device having an on-demand type multihead (ejection orifice diameter 35 microns, the resistance of a heat-generating resistance body 150 ohms, driving voltage 30 V, frequency 2 KHz) adapted to perform recording by giving thermal energy to the recording liquid within the recording head and generating liquid droplets of the recording liquid. In all tests, the recording liquid produced excellent results.

The colors of the resulting recorded images are shown in Table 1.

| Composition of the recording liquid | Amount (wt %) |
|---|---|
| C.I. Direct Black-19 ($a^*$0.1, $b^*$−4.1) | 1.5 |
| C.I. Direct Black-93 ($a^*$−0.6, $b^*$3.2) | 1.0 |
| Dye No. 3 in Table 2 ($a^*$−1.5, $b^*$−4.8) | 1.5 |
| Dye No. 3 in Table 4 ($a^*$5.3, $b^*$1.5) | 1.0 |
| Ethylene glycol | 15 |
| N—methylpyrrolidone | 10 |
| Water | 70 |

A recording liquid of the above composition was prepared in the same way as in Example 1, and then examined for ($T_1$) to ($T_5$) using a recording device having an on-demand type multihead (ejection orifice diameter 35 microns, the resistance of a heat-generating resistance body 150 ohms, driving voltage 30 V, frequency 2 KHz) adapted to perform recording by giving thermal energy to the recording liquid within the recording head and generating liquid droplets of the recording liquid. In all tests, the recording liquid produced excellent results.

The colors of the resulting recorded images are shown in Table 1.

TABLE 1

| | Recording substrates (by tradename) | | | |
|---|---|---|---|---|
| | Xerox paper 4024 (made by Xerox Corporation) | | Mitsubishi Diaform (made by Mitsubishi Paper Mills, Ltd. (basis weight: 64 g/cm²) | |
| | $a^*$ | $b^*$ | $a^*$ | $b^*$ |
| Example 1 | −0.5 | 0.4 | −0.6 | 0.2 |
| Example 2 | 0.3 | −0.4 | 0.2 | −0.5 |
| Example 3 | 0.2 | −1.1 | −0.1 | −0.9 |
| Example 4 | 0.2 | −0.5 | 0.6 | −0.4 |
| Example 5 | 0.4 | −0.8 | 0.3 | −0.6 |

TABLE 2

Dye No.     Structural formula in formula [III]

1

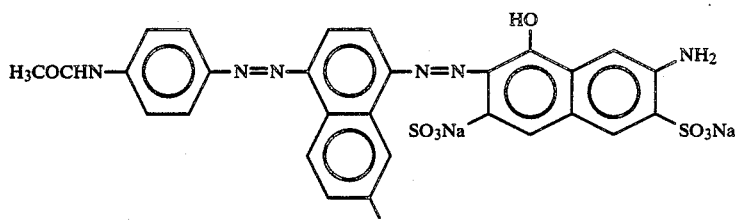

2

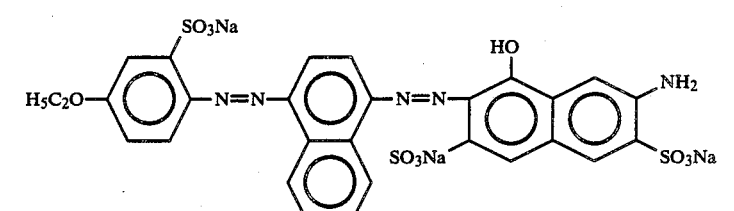

3

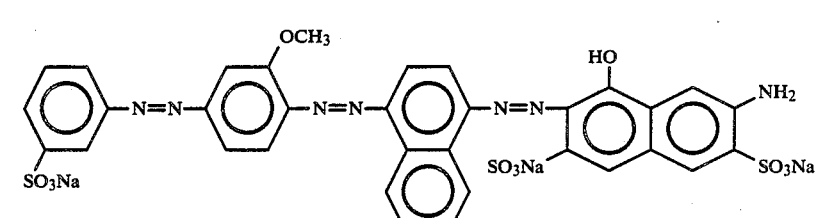

4

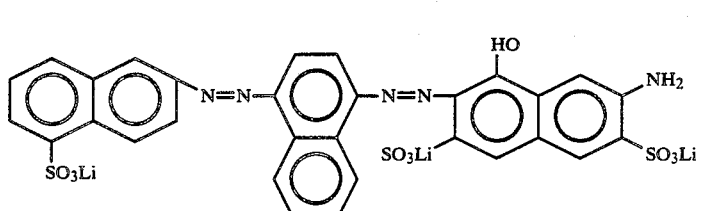

TABLE 2-continued

| Dye No. | Structural formula in formula [III] |
|---|---|
| 5 | (structure: phenyl-SO$_3$Li — N=N — (2-OCH$_3$ phenyl) — N=N — (2,5-di-OCH$_3$ phenyl) — N=N — (naphthalene with HO, NH$_2$, SO$_3$Li, SO$_3$Li)) |
| 6 | (structure: NaO$_3$S-phenyl — N=N — phenyl — N=N — (2,5-di-OC$_2$H$_5$ phenyl) — N=N — (naphthalene with HO, NH$_2$, SO$_3$Na, SO$_3$Na)) |

TABLE 3

| Dye No. | Structural formula in formula [IV] |
|---|---|
| 1 | (structure: naphthalene(SO$_3$Na, SO$_3$Na) — N=N — (2,5-di-OCH$_3$ phenyl) — N=N — (naphthalene with HO, SO$_2$Na) — N=N — (phenyl with NH$_2$, NH$_2$, SO$_3$Na)) |
| 2 | (structure: NaO$_3$S-phenyl — N=N — (phenyl-NHCOCH$_3$) — N=N — (naphthalene with HO, SO$_3$Na) — N=N — (phenyl with NH$_2$, NH$_2$, SO$_3$Na)) |
| 3 | (structure: KO$_3$S-phenyl — N=N — (2-OCH$_3$ phenyl) — N=N — (CH$_3$-phenyl) / (naphthalene with HO, SO$_3$K) — N=N — (phenyl with NH$_3$, NH$_2$, SO$_3$K)) |

TABLE 4

| Dye No. | Structural formula in formula [V] |
|---|---|
| 1 | (structure: LiO$_3$S-phenyl — N=N — (2-OCH$_3$ phenyl) — N=N — (CH$_3$-phenyl) — N=N — (naphthalene with HO, SO$_3$Li) — NH — (phenyl-SO$_3$Li)) |
| 2 | (structure: LiO$_3$S-naphthalene(SO$_3$Li) — N=N — (CH$_3$-phenyl) — N=N — (naphthalene with HO, SO$_3$Li) — NH — (phenyl-SO$_3$Li)) |

TABLE 4-continued

| Dye No. | Structural formula in formula [V] |
|---|---|
| 3 | (Structure: (HOH₄C₂)₃—HN—O₃S-naphthyl(SO₃NH(C₂H₄OH)₃)-N=N-tolyl(CH₃)-N=N-naphthyl(HO, SO₃NH(C₂H₄OH)₃)-NH-phenyl-SO₃NH(C₂H₄OH)₃) |
| 4 | (Structure: NaO₃S-phenyl-N=N-phenyl(NHCOC₂H₅)-N=N-phenyl(OCH₃)-N=N-naphthyl(HO, SO₃Na)-NH-phenyl-SO₃Na) |
| 5 | (Structure: phenyl(SO₃Li)-N=N-phenyl(OC₂H₅)-N=N-phenyl(NHCOCH₃)-N=N-naphthyl(HO, SO₃Li)-NH-phenyl-SO₃Li) |
| 6 | (Structure: naphthyl(SO₃Na)-N=N-phenyl(CH₃)-N=N-naphthyl(HO, SO₃Na)-NH-phenyl-SO₃Na) |
| 7 | (Structure: naphthyl(SO₃Na)-N=N-phenyl(CH₃)-N=N-naphthyl(HO, SO₃Na)-NH-phenyl-SO₃Na) |
| 8 | (Structure: naphthyl(SO₃NH₄)-N=N-phenyl(NHCOCH₃)-N=N-naphthyl(HO, SO₃NH₄)-NH-phenyl-SO₃NH₄) |
| 9 | (Structure: phenyl(SO₃Li)-N=N-phenyl(OCH₃)-N=N-phenyl(CH₃)-N=N-naphthyl(HO, SO₃Li)-NH₃ with SO₃Li) |

EXAMPLES 6 TO 15

Recording liquids having the compositions shown in Table 5 were prepared by the same method as in Example 1, and examined for (T₁) to (T₅) as in Example 1. In all tests, good black images could be obtained, and the results were excellent.

EXAMPLES 16 TO 25

Each of recording liquids of Examples 6 to 15 having the compositions shown in Table 5 below was filled in hollow felt pens. Using each felt pen, writing was made on a medium quality paper ("HAKUBOTAN", tradename, a product of Honshu Papermills Co.). As a result, each felt pen was writen with good black and without blurring.

The cap of each felt pen was removed, and each felt pen without cap was allowed to stand for 24 hours. The writing property of the pen was tested. As a result, good writing was made for each pen.

TABLE 5

| Example No. | Composition of the recording liquid | Amount (Wt %) |
|---|---|---|
| 6 | C.I. Direct Black-22 | 1.0 |
|   | C.I. Direct Black-113 | 1.0 |
|   | C.I. Acid Black-7 | 1.0 |
|   | C.I. Acid Black-27 | 1.0 |
|   | C.I. Acid Black-158 | 1.0 |
|   | Diethylene glycol | 15 |
|   | Dimethylacetamide | 15 |
|   | Water | 65 |
| 7 | C.I. Direct Black-62 | 1.5 |
|   | C.I. Acid Black-52:1 | 1.0 |
|   | C.I. Acid Black-208 | 1.0 |
|   | C.I. Direct Brown-127 | 1.5 |
|   | Propylene glycol | 10 |
|   | Dioxane | 10 |
|   | Water | 75 |
| 8 | C.I. Direct Black-108 | 1.5 |
|   | C.I. Acid Black-9 | 0.5 |
|   | C.I. Acid Black-110 | 1.0 |
|   | C.I. Acid Black-158 | 2.0 |
|   | Ethylene glycol | 15 |
|   | Glycerol | 10 |
|   | Triethylene glycol monomethyl ether | 10 |
|   | Water | 60 |
| 9 | C.I. Direct Black-159 | 1.0 |
|   | C.I. Acid Black-137 | 1.0 |
|   | Dye No. 2 in Table 2 | 2.0 |
|   | Dye No. 4 in Table 4 | 1.0 |
|   | Diethylene glycol | 10 |
|   | N—methylpyrrolidone | 10 |
|   | Water | 75 |
| 10 | Dye No. 1 in Table 3 | 1.0 |
|   | Dye No. 2 in Table 3 | 1.0 |
|   | Dye No. 6 in Table 4 | 2.0 |
|   | Polyethylene glycol | 10 |
|   | N—methylpyrrolidone | 16 |
|   | Water | 70 |
| 11 | Dye No. 3 in Table 3 | 1.5 |
|   | Dye No. 5 in Table 2 | 1.5 |
|   | Dye No. 5 in Table 4 | 2.0 |
|   | Ethylene glycol | 15 |
|   | 1,3-Dimethylimidazolidinone | 15 |
|   | Water | 65 |
| 12 | C.I. Direct Black-154 | 1.5 |
|   | Dye No. 6 in Table 2 | 1.5 |
|   | Dye No. 7 in Table 4 | 1.0 |
|   | Dye No. 8 in Table 4 | 1.0 |
|   | Diethylene glycol | 15 |
|   | N—methylpyrrolidone | 10 |
|   | Water | 70 |
| 13 | C.I. Acid Black-9 | 1.0 |
|   | C.I. Acid Black-94:1 | 1.0 |
|   | C.I. Direct Black-94 | 1.0 |
|   | Ethylene glycol | 17 |
|   | Dimethylacetamide | 10 |
|   | Water | 70 |
| 14 | C.I. Acid Black-29 | 0.5 |
|   | C.I. Acid Black-48 | 0.5 |
|   | C.I. Acid Black-187 | 1.0 |
|   | C.I. Direct Brown-59 | 2.0 |
|   | Ethylene glycol | 16 |
|   | 1,3-Dimethylimidazolidinone | 10 |
|   | Water | 70 |
| 15 | Dye No. 3 in Table 2 | 3.0 |
|   | Dye No. 9 in Table 4 | 1.0 |
|   | Diethylene glycol | 21 |
|   | N—methylpyrrolidone | 20 |
|   | Water | 55 |

REFERENTIAL EXAMPLE 1

Synthesis of Dye No. 3 in Table 2

(1) Production of a first diazo solution

Metanilic acid (17.3 g) was added to 346 ml of 3% hydrochloric acid. The mixture was stirred for 3 hours to form a uniform slurry. Ice (200 g) was added to cool the slurry to 3° C. An aqueous solution composed of 73 ml of water and 7.3 g of sodium nitrite was added to the slurry. The mixture was slurried at 3° C. for 1 hour to perform disazolization. Sulfonic acid (3 g) was added to remove the remaining sodium nitrite and to obtain a first diazo solution.

(2) First coupling 12.3 g of ortho-anisidine of the following formula

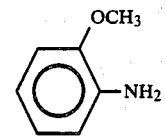

was added to 450 ml of 50% methanol-water and dissolved. To the solution were added the first diazo solution obtained in (1) above and 10 ml of 25% sodium hydroxide, and the mixture was stirred at a temperature of 0° to 3° C. and a pH of 2 to 3 for 15 hours to perform coupling. Sodium chloride (200 g) was added to perform salting out. The precipitated monoazo compound was filtered, washed with 500 ml of a 10% aqueous solution of sodium chloride, and dried to give 28.2 g of a monoazo compound of the following formula.

$$\underset{HO_3S}{\bigcirc}-N=N-\underset{}{\bigcirc}\overset{OCH_3}{-NH_2}$$

(3) Production of a second diazo solution

To 300 ml of 5% hydrochloric acid was added 15.4 g of the monoazo compound obtained in (2) above, and the mixture was stirred for 5 hours to form a uniform slurry. Ice (250 g) was added to cool the slurry to 3° C. An aqueous solution composed of 38 ml of water and 3.8 g of sodium nitrite was added to the slurry, and the mixture was stirred at 3° C. for 10 hours to perform disazotization. One gram of sulfamic acid was added to remove the remaining sodium nitrite and to form a second diazo solution.

(4) Second coupling

To 230 ml of water was added 11.2 g of 1-aminonaphthalene-7-sulfonic acid, and 400 g of ice, the second diazo solution obtained in (3) above and 10 ml of 25% sodium hydroxide were added. The mixture was subjected to coupling treatment at a temperature of 2° to 5° C. and a pH of 2 to 3. After the mixture was stirred for 5 hours at the above temperature and pH, 100 g of sodium chloride was added to perform salting out. The precipitated compound was filtered, washed with 300 ml of 10% aqueous sodium chloride solution, and dried to give 23.8 g of a disazo compound of the following formula.

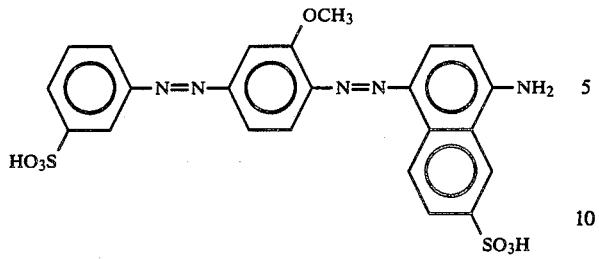

(5) Production of a third diazo solution 13.5 g of the disazo compound obtained in (4) above was added to 300 ml of 3% hydrochloric acid and 100 ml of acetic acid. The mixture was stirred for 3 hours to form a uniform slurry. Ice (300 g) was added to cool the slurry to 3° C. A solution of 1.8 g of sodium nitrite in 20 ml of water was added to the slurry, and the mixture was stirred at 3° C. for 24 hours to perform disazotization. Then, 0.5 g of sulfamic acid was added to remove the remaining sodium nitrite and to form a third diazo solution.

(6) Third coupling 8.0 g of 1-hydroxy-7-amino-naphthalene-3,6-disulfonic acid was added to 320 ml of water, and 600 g of ice, the third diazo solution obtained in (5), and 45 ml of 25% sodium hydroxide were added. The mixture was subjected to coupling treatment at a pH of 8 to 10 and a temperature of 2° to 5° C. After the mixture was stirred at this temperature and pH, 250 g of sodium chloride was added to perform salting out.

The precipitated compound was filtered and then washed with 400 ml of 20% aqueous sodium chloride solution to form 85 g of a wet cake.

The wet cake was subjected to de-salting treatment, and then dried to give 18.3 g of the desired compound of the following formula.

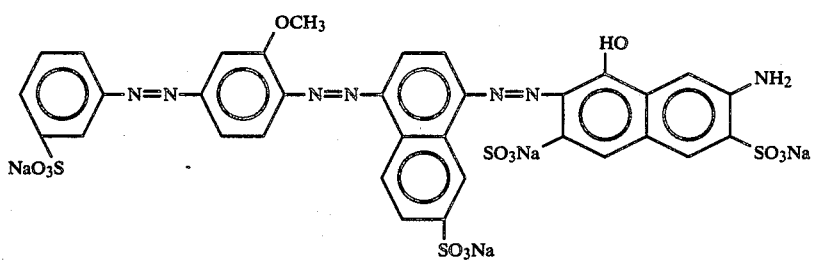

The yield has 76.3%.

This dye had a maximum absorption wavelength, in water, of 615 nm.

REFERENTIAL EXAMPLE 2

Synthesis of compound No. 1 in Table 3

(1) Production of a first diazo solution 30.2 g of 2-amino-naphthalene-4,8-disulfonic acid was added to 600 ml of 3% hydrochloric acid, and the mixture was stirred for 3 hours to form a uniform slurry. Ice (400 g) was added to cool the slurry to 3° C. A solution of 7.3 g of sodium nitrite in 73 ml of water was added to the slurry, and the mixture was then stirred at 3° C. for 1 hour to perform disazotization. Then, 3 g of sulfamic acid was added to remove the remaining sodium nitrite and to obtain a first diazo solution.

(2) First coupling 15.3 g of 2,5-dimethoxyaniline having the following formula

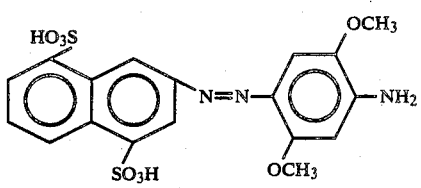

was added to 450 ml of water, and the mixture was stirred for 2 hours to form a uniform slurry. Ice (300 g), the first diazo solution obtained in (1) above, and 20 ml of 25% of sodium hydroxide were added. The mixture was subjected to coupling treatment by stirring it at a temperature of 0° to 3° C. and a pH of 2 to 3 for 15 hours. Then, 200 g of sodium chloride was added to perform salting out. The precipitated monoazo compound was filtered, washed with 500 ml of a 10% aqueous solution of sodium chloride, and dried to obtain 41.0 g of a monoazo compound having the following formula.

(3) Production of a second diazo solution 23.3 g of the monoazo compound obtained in (2) above was added to 410 ml of 5% hydrochloric acid, and the mixture was stirred for 5 hours to form a uniform slurry. Ice (300 g) was added to cool the slurry to 3° C. A solution of 3.8 g of sodium nitrite in 38 ml of water was added to the slurry, and the mixture was then stirred at 3° C. for 10 hours to perform disazotization. One gram of sulfamic acid was added to remove the resulting sodium nitrite and to obtain a second diazo solution.

(4) Second coupling 12.0 g of 1-hydroxy-7-amino-naphthalene-3-sulfonic acid was added to 460 ml of water, and 800 g of ice, the second diazo solution obtained in (3) above, and 55 ml of 25% sodium hydroxide were added to perform coupling at a temperature of 2° to 5° C. and a pH of 8 to 10. After the mixture was stirred at the above temperature and pH, 250 g of sodium chloride was added to perform salting out. The precipitated compound was filtered, washed with 300 ml of a 10% aqueous solution of sodium chloride, and dried to give 31.3 g of a disazo compound having the following formula.

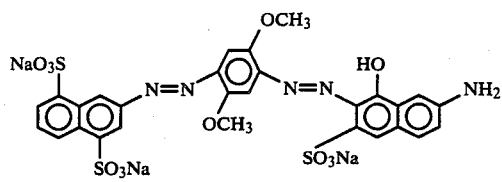

(5) Production of a third diazo solution 19.6 g of the disazo compound obtained in (4) above was added to 400 ml of 3% hydrochloric acid and 100 ml of acetic acid, and the mixture was stirred for 3 hours to form a uniform slurry. Ice (300 g) was added to cool the slurry to 3° C. A solution of 1.8 g of sodium nitrite in 20 ml of water was added to the slurry, and the mixture was stirred at 3° C. for 24 hours to perform disazotization. Then, 0.5 g of sulfamic acid was added to remove the remaining sodium nitrite and to obtain a third diazo solution.

(6) Third coupling 4.7 g of 1,3-diamino-benzene-4-sulfonic acid was added to 100 ml of water, and 50 g of ice was added to the mixture to cool it to 3° C. Then, the third diazo solution obtained in (5) above was added, and the mixture was stirred at 2° to 5° C. for 10 hours to perform coupling. Then, 250 g of sodium chloride was added to perform salting out.

The precipitated compound was filtered, and then washed with 400 ml of a 20% aqueous solution of sodium chloride to give 65 g of a wet cake.

The wet cake was subjected to de-salting treatment, and then dried to give 18.6 g of the desired compound of the following formula

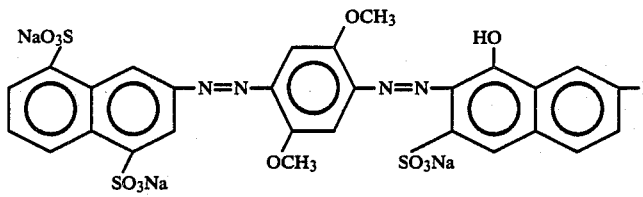

The yield was 74.1%.

This dye had a maximum absorption wavelength, in water, of 596 nm.

While this invention has been described in detail and with reference to specific embodiments thereof, it will be apparent to one skilled in the art that various changes and modifications can be made therein without departing from the spirit and scope thereof.

What is claimed is:

1. A recording liquid comprising at least two water-soluble dyes and a liquid medium, each of the dyes satisfying the condition defined by the following expression (I), and a mixture of these at least two dyes satisfying the condition defined by the following expression (II)

$$0 \leq \sqrt{a^{*}i^2 + b^{*}i^2} \leq 10 \quad [I]$$

$$0 \leq \sqrt{\left(\sum_{i=1}^{n} a^{*}i\right)^2 + \left(\sum_{i=1}^{n} b^{*}i\right)^2} \leq 2 \quad [II]$$

wherein $a^*$ and $b^*$ are chromaticness indices defined in the CIE 1976 ($L^*$, $a^*$, $b^*$) space, i indicates the ith dye of the dyes used together, and n is an integer of 2 or more wherein at least one of the water-soluble dyes is selected from dyes of group X given below, and one of the others is selected from dyes of group Y given below:

Dyes of group X

Dyes represented by the following formula [III]

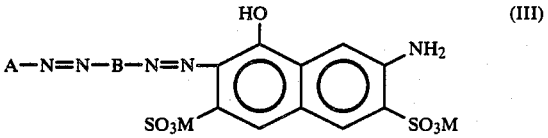

wherein A represents a phenyl group substituted by a $C_1$ to $C_4$ alkylcarbonylamino group, a $C_1$ to $C_4$ alkoxy group, the group $SO_3M$ or a phenylazo group which may optionally be substituted by the group $SO_3M$, or a naphthyl group substituted by the group $SO_3M$, B represents a naphthyl group substituted by the group $SO_3M$ or phenyl group substituted by a $C_1$ to $C_4$ alkoxy group, and M represents an alkali metal cation, ammonium or an amine cation;

Dyes represented by the following general formula [IV]

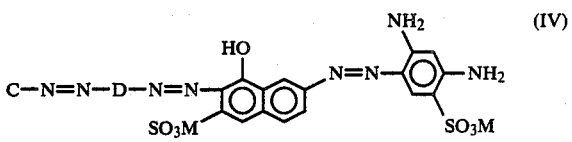

wherein C represents a phenyl or naphthyl group 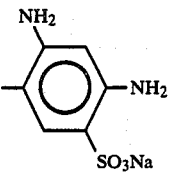 substituted by the group $SO_3M$, D represents a phenyl group substituted by a $C_1$ to $C_4$ alkyl group or a $C_1$ to $C_4$ alkoxy group or a $C_1$ to $C_4$ alkylcarbonylamino group, and M is as defined above;

C. I. Direct Black-19, -22, -62, -108, -113, -154 and -159; and

C. I. Acid Black 7, -9, -29, -48, -52:1, -94:1, -109, -110, -187 and -208.

Dyes of group Y

Dyes represented by the following formula [V]

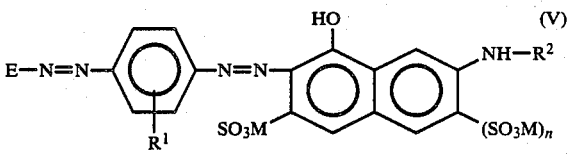

wherein E represents a naphthyl group substituted by the group $SO_3M$ or a phenyl group substituted by a $C_1$ to $C_4$ alkyl group, a $C_1$ to $C_4$ alkoxy group, a $C_1$ to $C_4$ alkylcarbonylamino group, or a phenylazo group which may optionally be substituted by the group $SO_3M$, $R^1$ represents a $C_1$ to $C_4$ alkyl group, a $C_1$ to $C_4$ alkoxy group or a $C_1$ to $C_4$ alkylcarbonylamino group, $R^2$ represents a hydrogen atom or a phenyl group substituted by the group $SO_3M$, n represents 0 or 1, and M is as defined above;

C. I. Acid Black-27, -137 and -158;
C. I. Direct Black-64, -93 and -94; and
C. I. Direct Brown-59 and -127.

2. The recording liquid as in claim 1 wherein the water-soluble dyes are a combination of a dye of the following formula [III] or [IV] and a dye of the following formula [V],

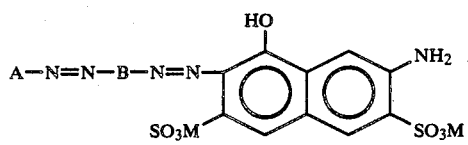

wherein A represents a phenyl group substituted by a $C_1$ to $C_4$ alkylcarbonylamino group, a $C_1$ to $C_4$ alkoxy group, the group $SO_3M$, or a phenylazo group which may optionally be substituted by the group $SO_3M$, or a naphthyl group substituted by the group $SO_3M$, B represents a naphthyl group substituted by the group $SO_3M$ or a phenyl group substituted by a $C_1$ to $C_4$ alkoxy group, and M represents an alkali metal cation, ammonium or an amine cation,

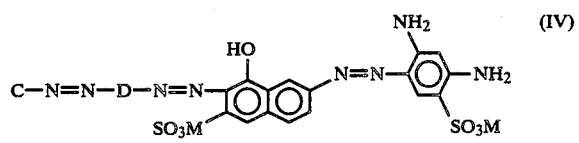

wherein C represents a phenyl or naphthyl group substituted by the group $SO_3M$, D represents a phenyl group substituted by a $C_1$ to $C_4$ alkyl group, a $C_1$ to $C_4$ alkoxy group or a $C_1$ to $C_4$ alkylcarbonylamino group, and M is as defined above,

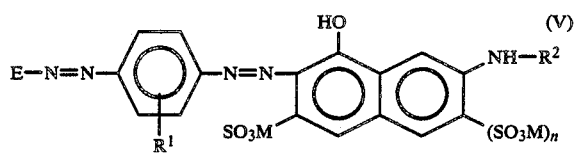

wherein E represents a naphthyl group substituted by the group $SO_3M$, or a phenyl group substituted by a $C_1$ to $C_4$ alkyl group, a $C_1$ to $C_4$ alkoxy group, a $C_1$ to $C_4$ alkylcarbonylamino group or a phenylazo group which may optionally be substituted by the group $SO_3M$, $R^1$ represents a $C_1$ to $C_4$ alkyl group, a $C_1$ to $C_4$ alkoxy group or a $C_1$ to $C_4$ alkylcarbonylamino group, a $C_1$ to $C_4$ alkoxy group or a $C_1$ to $C_4$ alkylcarbonylamino group, $R^2$ represents a hydrogen atom or a phenyl group substituted by the group $SO_3M$, n represents 0 or 1, and M is as defined above.

3. The recording liquid as in claim 1 or 2, wherein in general formula [III], A is a phenyl group having at least one substituent selected from a $C_1$ to $C_4$ alkylcarbonylamino group, a $C_1$ to $C_4$ alkoxy group, the group $SO_3M$ and a $SO_3M$-substituted phenylazo group.

4. The recording liquid as claim 1 or 2, wherein in the formula [III], A is a naphthyl group substituted by the group $SO_3M$.

5. The recording liquid as in claim 1 or 2, wherein in the formula [III], B is a naphthyl group substituted by the group $SO_3M$, or a di $C_1$ to $C_4$ alkoxy-substituted phenyl group.

6. The recording liquid as in claim 1 or 2, wherein in the formula [III], M is Na or Li.

7. The recording liquid as in claim 1 or 2, wherein in the formula [IV], C is a phenyl group substituted by the group $SO_3M$.

8. The recording liquid as in claim 1 or 2, wherein in the formula [IV], C is a naphthyl group substituted by the group $SO_3M$.

9. The recording liquid as in claim 1 or 2, wherein in the formula [IV], D is a $C_1$ to $C_4$ alkoxy-substituted phenyl group or a $C_1$ to $C_4$ alkylcarbonylamino-substituted phenyl group.

10. The recording liquid as in claim 1 or 2, wherein in the formula [V], E is a phenylazo group substituted by the group $SO_3M$.

11. The recording liquid as in claim 1 or 2, wherein in the formula [V], E is a naphthyl group substituted by the group $SO_3M$.

12. The recording liquid as in claim 1 or 2, wherein in the formula [V], $R^1$ represents a methyl, methoxy, ethoxy or acetylamino group.

13. The recording liquid as in claim 1 or 2, wherein in the formula [V], $R^2$ is a phenyl group substituted by the group $SO_3M$.

14. The recording liquid as in claim 1 or 2, wherein in the formula [V], M is Na, Li or a $C_1$ to $C_4$ alkanolammonium.

15. The recording liquid as in claim 1, wherein the water-soluble dyes are a mixture of C. I. Direct Black-154 as a dye of group X and C. I. Direct Brown-59 as a dye of group Y.

16. The recording liquid as in claim 1, wherein the water-soluble dyes are a mixture of C. I. Direct Black-19 and -109 as dyes of group X and C. I. Direct Black-64 as a dye of group Y.

17. The recording liquid as in claim 1, wherein the water-soluble dyes are a mixture of a dye of the following formula [a] in group X, and a dye of the following formula [b] in group Y:

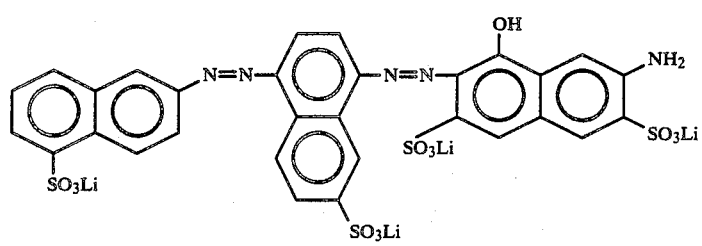

(a)

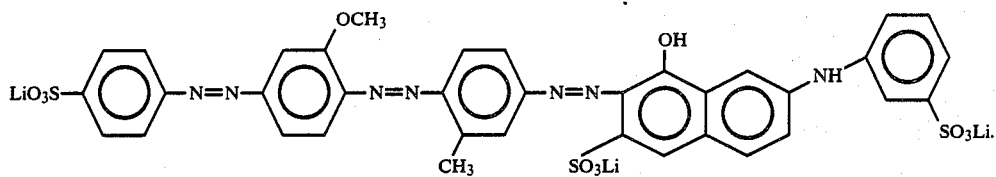
(b)

18. The recording liquid as in claim 1, wherein the water-soluble dyes are a mixture of C. I. Direct Black-19 and a dye of the following formula [c] in group X and C. I. Direct Black-93 and a dye of the following formula [d] in group Y:

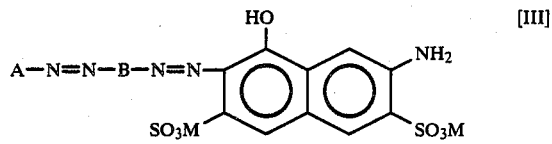
[III]

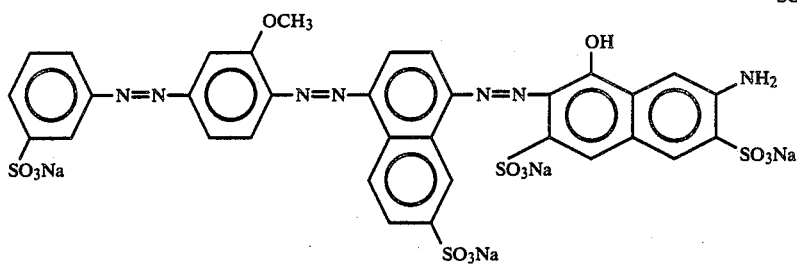
(c)

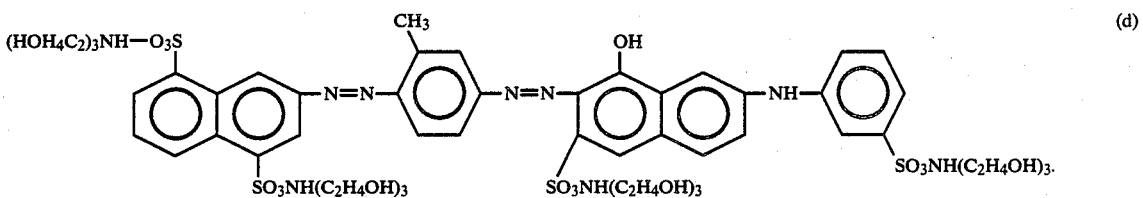
(d)

19. The recording liquid as in claim 1, wherein the total content of the water-soluble dyes is 0.5 to 15% by weight based on the total weight of the recording liquid.

20. The recording liquid as in claim 1, wherein the total content of the water-soluble dyes is 1 to 8% by weight based on the total weight of the recording liquid.

21. The recording liquid as in claim 1, wherein the liquid medium is water or a mixture of water with a water-soluble organic solvent.

22. A water-soluble dye composition comprising a mixture of at least two water-soluble dyes, each of the dyes satisfying the condition defined by the following expression [I], and the mixture of at least two water-soluble dyes satisfying the condition defined by the following expression [II], $$0 \leq \sqrt{a^{*}i^2 + b^{*}i^2} \leq 10 \quad [I]$$

$$0 \leq \sqrt{\left(\sum_{i=1}^{n} a^{*}i\right)^2 + \left(\sum_{i=1}^{n} b^{*}i\right)^2} \leq 2 \quad [II]$$

wherein a* and b* are chromaticness indices defined in the CIE 1976 (L*, a*, b*) space, i indicates the ith dye of the dyes used together, and n is an integer of 2 or more wherein at least one of the water-soluble dyes is selected from dyes of group X given below, and one of the others is selected from dyes of group Y given below:

Dyes of group X

Dyes represented by the following formula [III]

wherein A represents a phenyl group substituted by $C_1$ to $C_4$ alkylcarbonylamino group, a $C_1$ to $C_4$ alkoxy group, the group $SO_3M$ or a phenylazo group which may optionally be substituted by the group $SO_3M$, or a naphthyl group substituted by the group $SO_3M$, B represents a naphthyl group substituted by the group $SO_3M$ or a phenyl group substituted by a $C_1$ to $C_4$ alkoxy group, and M represents an alkali metal cation, ammonium or an amine cation.

Dyes represented by the following general formula [IV]

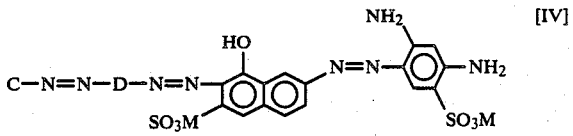
[IV]

wherein C represents a phenyl or naphthyl group substituted by the group $SO_3M$, D represents a phenyl group substituted by a $C_1$ to $C_4$ alkyl group a $C_1$ to $C_4$ alkoxy group or a $C_1$ to $C_4$ alkylcarbonylamino group, and M is as defined above;

C. I. Direct Black-19, -22, -62, -108, -113, -154 and -159; and

C. O. Acid Black-7, -9, -29, -48, -52:1, -94:1, -109, -110, -187 and -208.

Dyes of group Y

Dyes represented by the following formula [V]

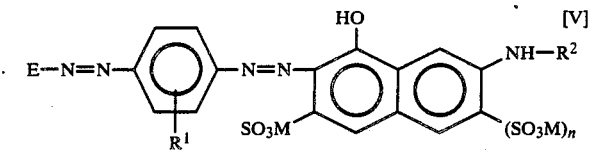

wherein E represents a naphthyl group substituted by the group SO₃M or a phenyl substituted by a C₁ to C₄ alkyl group, a C₁ to C₄ alkoxy group, a C₁ to C₄ alkylcarbonylamino group, or a phenylazo group which may optionally be substituted by the group SO₃M, $R^1$ represents a $C_1$ to $C_4$ alkyl group, a $C_1$ to $C_4$ alkoxy group or a $C_1$ to $C_4$ alkylcarbonylamino group, $R^2$ represents a hydrogen atom or a phenyl group substituted by the group SO₃M, n represents 0 or 1, and M is as defined above;

C. I. Acid Black-27, -137 and -158;
C. I. Direct Black-64, -93 and -94; and
C. I. Direct Brown-59 and -127.

23. The water-soluble dye composition as in claim 22 wherein the water-soluble dyes are a combination of a dye of the following formula [III] or [IV] and a dye of the following formula [V]:

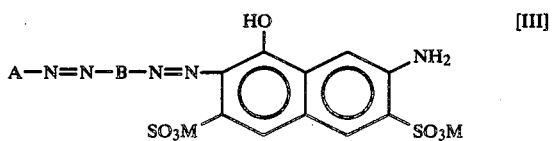

wherein A represents a phenyl group substituted by a $C_1$ to $C_4$ alkylcarbonylamino group, a $C_1$ to $C_4$ alkoxy group, the group SO₃M or a phenylazo group which may optionally be substituted by the group SO₃M, or a naphthyl group substituted by the group SO₃M, B represents a naphthyl group substituted by the group SO₃M or a phenyl group substituted by a $C_1$ to $C_4$ alkoxy group, and M represents an alkali metal cation, ammonium or an amine cation,

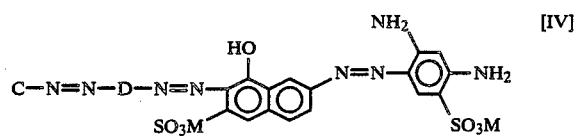

wherein C represents a phenyl or naphthyl group substituted by the group SO₃M, D represents a phenyl group substituted by a $C_1$ to $C_4$ alkyl group, a $C_1$ to $C_4$ alkoxy group or a $C_1$ to $C_4$ alkylcarbonylamino group, and M is as defined above,

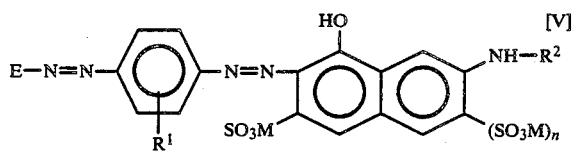

wherein E represents a naphthyl group substituted by the group SO₃M or a phenyl group substituted by a $C_1$ to $C_4$ alkyl group, a $C_1$ to $C_4$ alkoxy group, a $C_1$ to $C_4$ alkylcarbonylamino group, or a phenylazo group which may optionally be substituted by the group SO₃M, $R^1$ represents a $C_1$ to $C_4$ alkyl group, a $C_1$ to $C_4$ alkoxy group or a $C_1$ to $C_4$ alkylcarbonylamino group, $R^2$ represents a hydrogen atom or a phenyl group substituted by the group SO₃M, n represents 0 or 1, and M is as defined above.

24. The water-soluble dye composition as in claim 22 or 23, wherein in the formula [III], A is a phenyl group having at least one substituent selected from a $C_1$ to $C_4$ alkylcarbonylamino group, a $C_1$ to $C_4$ alkoxy group, the group SO₃M and a SO₃M-substituted phenylazo group.

25. The water-soluble dye composition as in claim 22 or 23, wherein in the formula [III], A is a naphthyl group substituted by the group SO₃M.

26. The water-soluble dye composition as in claim 22 or 23, wherein in the formula [III], B is a naphthyl group substituted by the group SO₃M or a di-lower alkoxy-substituted phenyl group.

27. The water-soluble dye composition as in claim 22 or 23, wherein in the formula [III], M is Na or Li.

28. The water-soluble dye composition as in claim 22 or 23, wherein in the formula [IV], C is a phenyl group substituted by the group SO₃M.

29. The water-soluble dye composition as in claim 22 or 23, wherein in the formula [IV], C is a naphthyl group substituted by the group SO₃M.

30. The water-soluble dye composition as in claim 22 or 23, wherein in the formula [IV], D is a $C_1$ to $C_4$ substituted phenyl group of a $C_1$ to $C_4$ alkylcarbonylamino-substituted phenyl group.

31. The water-soluble dye composition as in claim 22 or 23, wherein in the formula [V], E is a phenylazo group substituted by the group SO₃M.

32. The water-soluble dye composition as in claim 22 or 23, wherein in the formula [V], E is a naphthyl group substituted by the group SO₃M.

33. The water-soluble dye composition as in claim 22 or 23, wherein in the formula [V], $R^1$ represents a methyl, methoxy, ethoxy or acetylamino group.

34. The water-soluble dye composition as in claim 22 or 23, wherein in the formula [V], R₂ is a phenyl group substituted by the group SO₃M.

35. The water-soluble dye composition as in claim 22 or 23, wherein the formula [V], M is Na, Li, or a $C_1$ to $C_4$ lower alkanolammonium.

36. The water-soluble dye composition as in claim 22, wherein the water-soluble dyes are a mixture of C. I. Direct Black-154 as a dye of group X and C. I. Direct Brown-59 as a dye of group Y.

37. The water-soluble dye composition as in claim 22, wherein the water-soluble dyes are a mixture of C. I. Direct Black-19 and -109 as dyes of group X and C. I. Direct Black-64 as a dye of group Y.

38. The water-soluble dye composition as in claim 22, wherein the water-soluble dyes are a mixture of a dye of the following formula [a] in group X, and a dye of the following formula [b] in group Y:

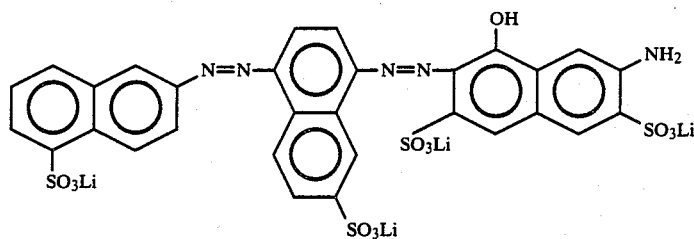
(a)
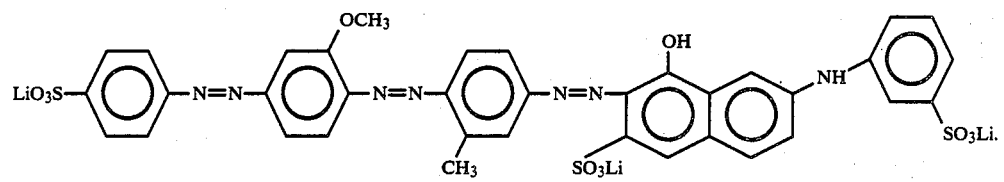
(b)
39. The water-soluble dye composition as in claim 2, wherein the water-soluble dyes are a mixture of C. I. Direct Black-19 and a dye of the following formula [c] in group X and C. I. Direct Black-93 and a dye of the following formula [d] in group Y:
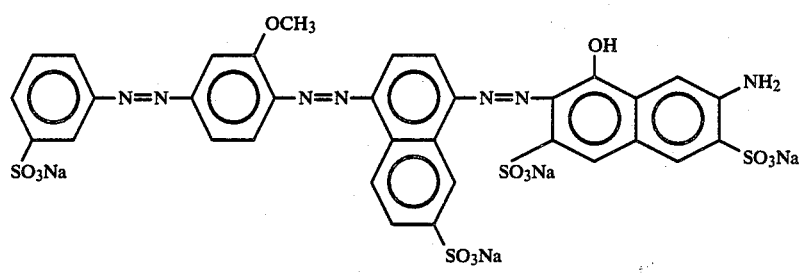
(c)
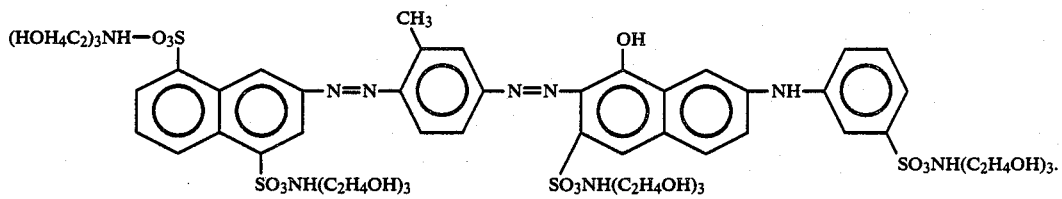
(d)
* * * * *